United States Patent
Li et al.

(10) Patent No.: US 9,984,487 B2
(45) Date of Patent: May 29, 2018

(54) FACIAL GESTURE DRIVEN ANIMATION COMMUNICATION SYSTEM

(71) Applicant: Intel Corporation, Santa Clara, CA (US)

(72) Inventors: Wenlong Li, Beijing (CN); Xiaofeng Tong, Beijing (CN); Yangzhou Du, Beijing (CN); Thomas Sachson, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 14/773,911

(22) PCT Filed: Sep. 24, 2014

(86) PCT No.: PCT/CN2014/087280
§ 371 (c)(1),
(2) Date: Sep. 9, 2015

(87) PCT Pub. No.: WO2016/045010
PCT Pub. Date: Mar. 31, 2016

(65) Prior Publication Data
US 2016/0292901 A1 Oct. 6, 2016

(51) Int. Cl.
*G06T 13/40* (2011.01)
*G06K 9/00* (2006.01)
*G06T 13/80* (2011.01)

(52) U.S. Cl.
CPC ............... *G06T 13/40* (2013.01); *G06K 9/00* (2013.01); *G06K 9/00275* (2013.01);
(Continued)

(58) Field of Classification Search
CPC ........ A61M 2205/50; A61M 2205/502; A61M 2205/581; A61M 2205/582;
(Continued)

(56) References Cited

U.S. PATENT DOCUMENTS 6,400,374 B2 * 6/2002 Lanier ..................... G06F 3/14
345/630
2008/0120113 A1 5/2008 Loyall et al.
(Continued)

FOREIGN PATENT DOCUMENTS

CN 101690071 A 3/2010
CN 102934144 A 2/2013
(Continued)

OTHER PUBLICATIONS

"International Application Serial No. PCT/CN2014/087280, International Search Report dated Jun. 30, 2015", 5 pgs.
(Continued)

*Primary Examiner* — Sing-Wai Wu
(74) *Attorney, Agent, or Firm* — Schwegman Lundberg & Woessner, P.A.

(57) ABSTRACT

Examples of systems and methods for transmitting facial motion data and animating an avatar are generally described herein. A system may include an image capture device to capture a series of images of a face, a facial recognition module to compute facial motion data for each of the images in the series of images, and a communication module to transmit the facial motion data to an animation device, wherein the animation device is to use the facial motion data to animate an avatar on the animation device.

22 Claims, 6 Drawing Sheets

(52) U.S. Cl.
CPC ..... *G06K 9/00315* (2013.01); *G06K 9/00355* (2013.01); *G06T 13/80* (2013.01); *G06T 2207/30201* (2013.01)

(58) Field of Classification Search
CPC ........ A61M 2205/583; A61M 2205/59; A61M 2205/8206; G06K 9/00; G06K 9/00275; G06K 9/00315; G06K 9/00355; G06T 13/40; G06T 13/80; G06T 2207/30201
See application file for complete search history.

(56) References Cited

U.S. PATENT DOCUMENTS

| | | | | |
|---|---|---|---|---|
| 2009/0002479 | A1* | 1/2009 | Sangberg | H04N 7/14 348/14.02 |
| 2010/0309147 | A1* | 12/2010 | Fleizach | G06F 3/041 345/173 |
| 2011/0304629 | A1* | 12/2011 | Winchester | G06T 13/40 345/473 |
| 2014/0160035 | A1* | 6/2014 | Sauer | G06F 3/041 345/173 |
| 2014/0176662 | A1* | 6/2014 | Goodman | H04N 7/141 348/14.07 |
| 2014/0218371 | A1 | 8/2014 | Du et al. | |
| 2016/0249081 | A1* | 8/2016 | Capobianco | H04N 21/242 |

FOREIGN PATENT DOCUMENTS

| | | |
|---|---|---|
| CN | 103207745 A | 7/2013 |
| CN | 103366782 A | 10/2013 |
| CN | 103631370 A | 3/2014 |
| CN | 104011738 A | 8/2014 |
| WO | WO-2016045010 A1 | 3/2016 |

OTHER PUBLICATIONS

"International Application Serial No. PCT/CN2014/087280, Written Opinion dated Jun. 30, 2015", 5 pgs.
"European Application Serial No. 14902447.3, Extended European Search Report dated Mar. 19, 2018", 8 pgs.

* cited by examiner

FACIAL GESTURE DRIVEN ANIMATION COMMUNICATION SYSTEM

This patent application is a U.S. National State Application under 35 U.S.C. 371 from International Application PCT/CN2014/087280, filed Sep. 24, 2014, which is hereby incorporated by reference in its entirety.

BACKGROUND

Messaging services including instant messaging services and email, among others, provide users with many different types of emoticons, or emotion icons, for expressing emotions demonstratively. Emoticons may include animations where a series of images are used together to create a video or animation. Emoticons are selectable by users, and even often customizable by users. However, these approaches limit the creativity of users and limit the customizability of the animations to already created emoticons.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Existing approaches generally constrain users to predefined emoticons and animations. Various systems and techniques are described here to present users with an option for creating a facial gesture-driven animation.

Figure 1:
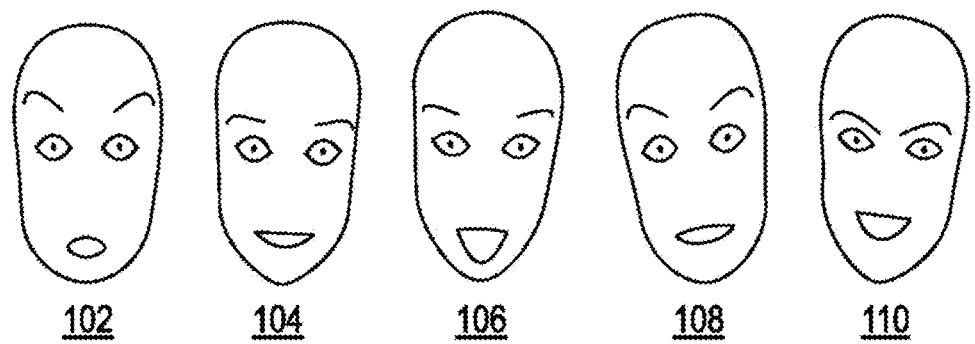
FIG. 1 is a schematic diagram illustrating an avatar for animation, according to an embodiment.

FIG. 1 is a schematic diagram illustrating an avatar for animation, according to an embodiment. An avatar is a graphical representation that is capable of representing a facial feature of a user. Avatar graphic representations or animation snapshots 102, 104, 106, 108, and 110 represent different images of an animation driven by a user's facial gestures. For example, animation snapshot 106 represents a user's face when the user has his or her mouth open, and animation snapshot 104 represents a user's face when the user has his or her mouth closed. The series of animation snapshot 102-110 may be combined to make an animation of an avatar. The avatar may include other features not included in FIG. 1, such as a body, arms, hands, legs, feet, a tail, or the like. These other features may be animated using facial gestures, other gestures, other inputs, or the like.

Figure 2:
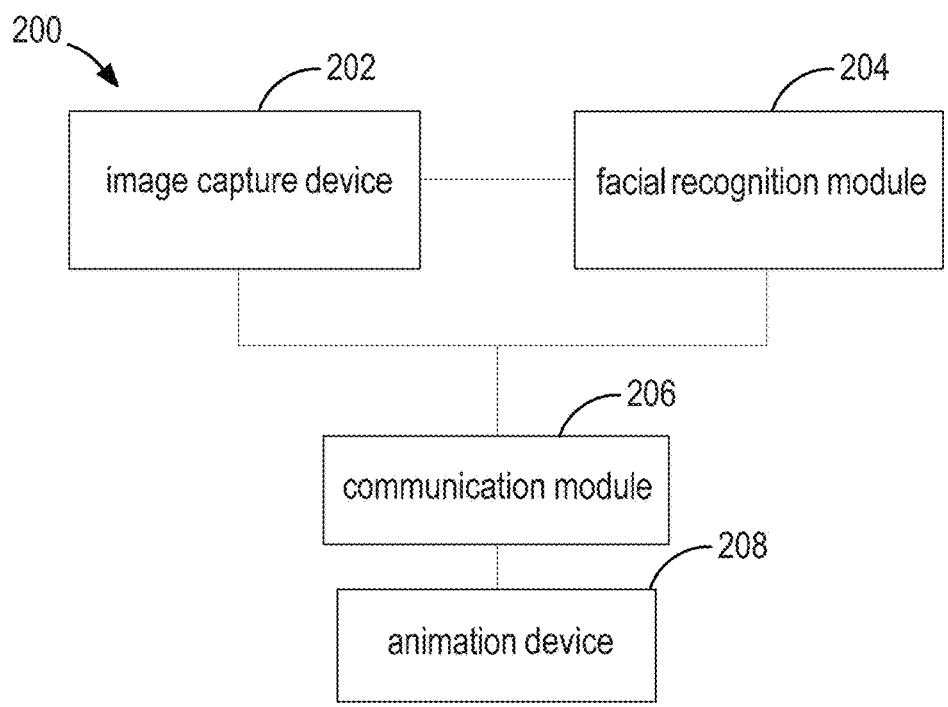
FIG. 2 is a block diagram illustrating a system for transmitting facial motion data, according to an embodiment.

FIG. 2 is a block diagram illustrating a system 200 for transmitting facial motion data, according to an embodiment. The system 200 includes an image capture device 202 to capture a series of images of a face. In an example, the image capture device 202 may be a camera. The system 200 also includes a facial recognition module 204 to compute facial motion data for each of the images in the series of images. The system 200 also includes a communication module 206 to transmit the facial motion data to an animation device 208, where the animation device 208 may be configured to use the facial motion data to animate an avatar on the animation device 208.

In an example, facial motion data may be a set of facial coordinates, information about movements of a face, or the like. In an example, an image is captured by the image capture device 202, such as a camera. For example, a user may take a picture using a camera on a phone, tablet, computer, or the like. The facial recognition module 204, also referred to as a facial gesture engine, is used to capture the user's facial features. The user may take a series of images, such as a video of his or her face. The series of images may be used by the facial recognition module 204 to determine facial motion data for each of the images in the series of images. The user may select an avatar from a library of various avatars. Different libraries or sub-libraries may exist for different types of avatars, such as an avatar corresponding to a television show or location-based avatars, or different avatar parts, such as would be used to animate facial features, other features, or other inputs, or the like Animations or parts of animations may be stored in other libraries. In an example, a conversion table may be accessed that maps a gesture to a particular animation (e.g., if a user winks in a series of images, then a tail may be animated to move from side to side in the animation).

In an example, an animation creation module may be configured such that it animates a chosen avatar by using captured facial gestures, or facial motion data. For example, a facial gesture may be mapped to facial motion data for an avatar to create a series of images and the images may be packaged together to create the animation. The facial motion data may also be saved independently of the avatar or the animation, and the facial motion data may be sent to the animation device 208. The animation device 208 may access the facial motion data and use an avatar to create an animation using the facial motion data. This approach may conserve network bandwidth because less data is transmitted, for example transmitting coordinate data and omitting image data.

In an example, an avatar may be selected using an application (or an App, as is commonly referenced when discussing applications on mobile devices). The application may allow a user to select an avatar, access a camera on a device, and record a series of facial gesture images. The application may be configured to present a selection screen to the user, where the user is able to select an avatar from a repository of avatars. The selection screen may provide a list of avatars by description (e.g., name) or images (e.g., thumbnails). The selection screen may also provide a browse or open dialog interface so the user is able to open a specific avatar file from an arbitrary location. The application may then determine facial motion data from the series of facial gesture images and animate the selected avatar using the facial motion data. The application may also be used by the user to send the facial motion data to an animation device. The user may also specify a number of other options to send to the animation device, such as an avatar or an avatar identifier (a unique identifier for a particular avatar), other gesture commands, other input commands, or audio. The facial motion data may be sent to the animation device over a short-range or long-range network or directly, such as by using a wired serial connection, a universal serial bus (USB) drive, a point-to-point connection (e.g., near field communication), or otherwise.

The animation device 208 may include the application or a client application that may receive the facial motion data or other data. The animation device 208 may use the facial motion data to animate an avatar and display the animation on the animation device, or elsewhere.

A personalized animation snapshot image may be created using an animation of an avatar. The snapshot image may be used as a thumbnail for an animation file containing the animation. The animation may be stored locally or remotely such that it may be accessed by a user at a later time and reused. The facial motion data or the avatar or avatar identifier may be stored locally or remotely such that they may be used by a user at a later time, either in combination or separately. An avatar may be represented using a two-dimensional or three-dimensional figure.

Figure 3:
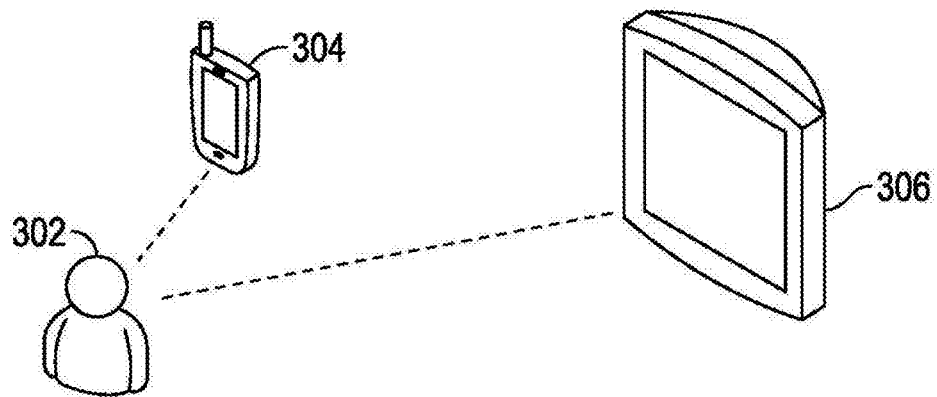
FIG. 3 is a schematic diagram illustrating a system for displaying an avatar at a first device corresponding to content on a second device.

FIG. 3 is a schematic diagram illustrating a system for displaying an avatar at a first device corresponding to content on a second device. In FIG. 3, a user 302 is engaged in second-screen usage with a mobile device 304 while viewing content on a second device 306. For example, the content may be an event, performance, television show, movie, video game, or the like.

In an example, a user 302 may use mobile device 304 to identify the content. The mobile device 304 may then present avatars to the user, such that the avatars are from the content or have some sort of connection to the content. This connection is not limited to avatars directly representing the content, but could also include any avatar that a user might appreciate using when viewing the content. For example, if a user is watching a television program on the history of baseball, an avatar representing a mascot of a team may be presented to the user, even if the team or mascot is not featured in the television program. In another example, if a user is watching a cartoon television program, characters from that cartoon or other cartoons may be presented to the user. In an example, an avatar can be presented to a user viewing content and the avatar can be presented to the same user or a different user viewing different content. For example, if the second device 306 is showing an event, such as a sporting event, an avatar representing a mascot of a team playing in the sporting event or an avatar of a player on the team may be presented to the user. An avatar representing a mascot may be presented for the television program on the history of baseball and the sporting event.

In an example, a user may use a mobile device 304 to take an image of the second device 306 showing the content. The identity of the content may be obtained by using the image and an image matching program. The mobile device 304 may take the image of the second device 306 after receiving an input, such as a software button, phone shake, vocal command, or the like. In another example, the image may be uploaded to the cloud directly from the second device 306, or the image may be sent from the second device 306 to the mobile device 304 and then sent to the cloud.

After the content is identified, an avatar may be presented to the user. The avatar may be presented using thumbnails, animations of the avatar, or the like. The avatar may be stored locally at the mobile device 304. The avatar may be downloaded to the mobile device 304. Voice tone parameters for the avatar may also be presented to the user or may be activated when the user selects the avatar. In another example, the content may be identified using audio obtained by the mobile device 304. In yet another example, a user may manually identify the television program.

The mobile device 304 may display an animation using facial motion data and an avatar identifier for an avatar corresponding to content on the second device 306. The animation displayed by the mobile device 304 may use the avatar corresponding to the content or it may use a different avatar, stored locally or downloaded.

A user may select an avatar, such as the avatar corresponding to the content, to be used in an animation. The user may send an animation or facial motion data and an avatar identifier for the avatar corresponding to the content to an animation device. The animation device may use the facial motion data and the avatar identifier to generate an animation using the avatar corresponding to the content.

In another example, the user 302 may use the mobile device 304 to identify content from an image taken by an image capture device. The image capture device can be the mobile device 304. The user 302 may use the image capture device to take an image of an event, performance. For example, the user 302 may attend a live sporting event, a theatre performance, or the like, and use the image capture device to take an image. An avatar may be presented to the user corresponding to the live sporting event, theatre performance, etc. In this example, the user 302 can be presented with the avatar without using the second device 306.

Figure 4:
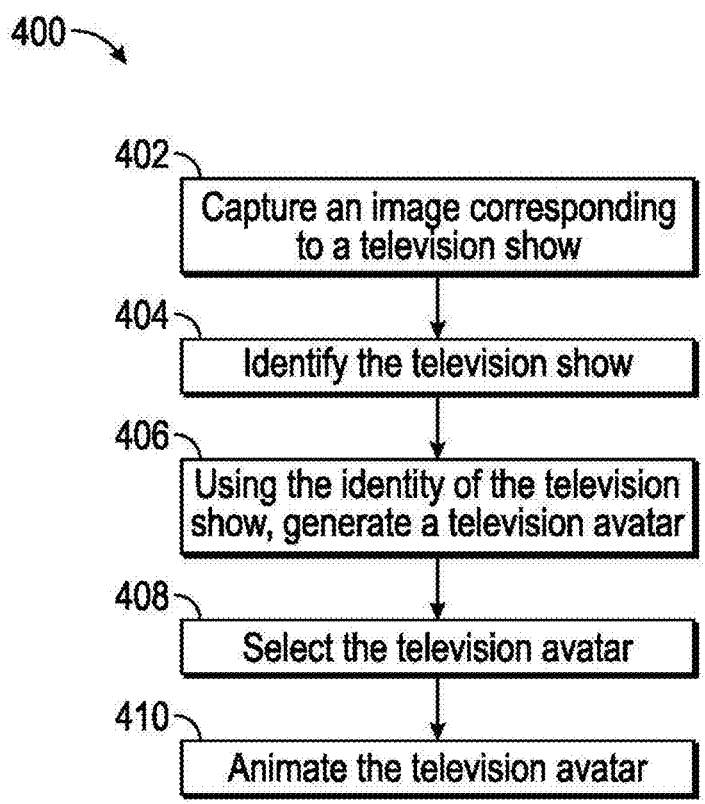
FIG. 4 is a flow chart illustrating a method for animating an avatar corresponding to a television show, according to an embodiment.

FIG. 4 is a flow chart illustrating a method 400 for animating an avatar corresponding to a television show, according to an embodiment. The method 400, may include capturing an image corresponding to a television show 402, identifying the television show 404, and using the identity of the television show to generate a television avatar 406. The method 400 may include selecting the television avatar 408 and animating the television avatar 410. The method 400 in FIG. 4 is an example of a method for facial gesture driven animation communication that may comprise capturing a series of images of a face at an image capture device, computing facial motion data for each of the images in the series of images, and transmitting the facial motion data to an animation device, wherein the animation device may be configured to use the facial motion data to animate an avatar on the animation device. In an example, the image capture device may capture an image corresponding to content, such as an image corresponding to a television show (block 402). The content may be identified using the image corresponding to the content, such as by identifying the television show. In an example, a second avatar may be generated using the identity of the content, wherein the second avatar corresponds to the content. For example, the second avatar may be a television avatar (block 406). The animation device may be configured to animate the second avatar, such as the television avatar (410). The second avatar may be an avatar corresponding to any of the content previously discussed.

Figure 5A:
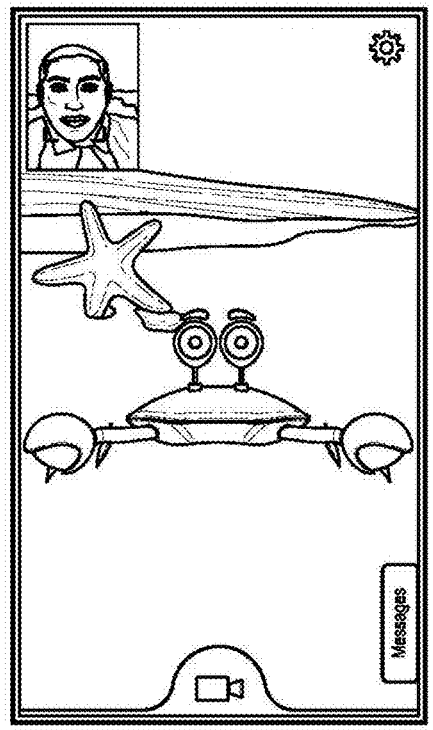
FIGS. 5A and 5B are schematic diagrams illustrating products for animating avatars using facial motion data, according to an embodiment.
Figure 5B:
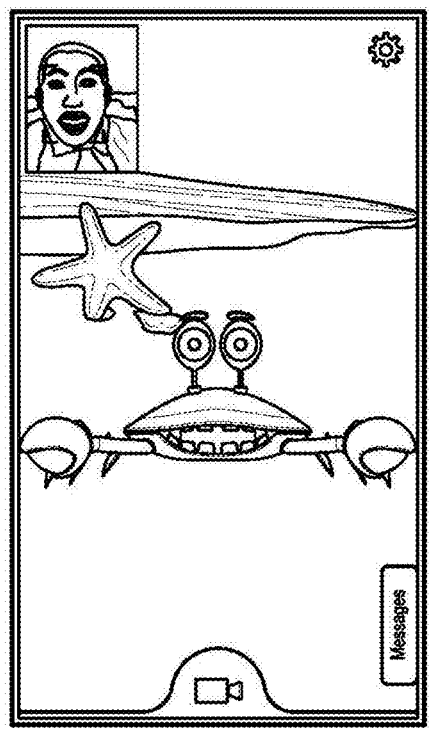

FIGS. 5A and 5B are schematic diagrams illustrating products for animating avatars using facial motion data, according to an embodiment. For example, FIG. 5A shows a user with his mouth closed, and an avatar in a position that represents the user's face when the user has his mouth closed. FIG. 5B shows a user with his mouth open, and an avatar in a position that represents the user's face when the user has his mouth open.

Figure 6A:
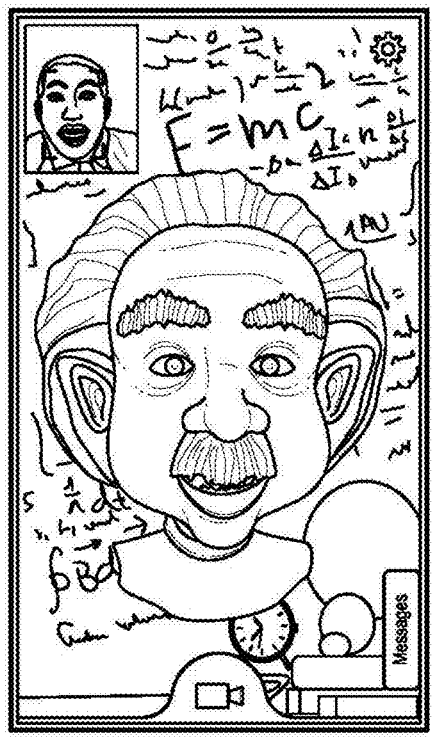
FIGS. 6A and 6B are schematic diagrams illustrating products for animating avatars and choosing backgrounds, according to an embodiment.
Figure 6B:
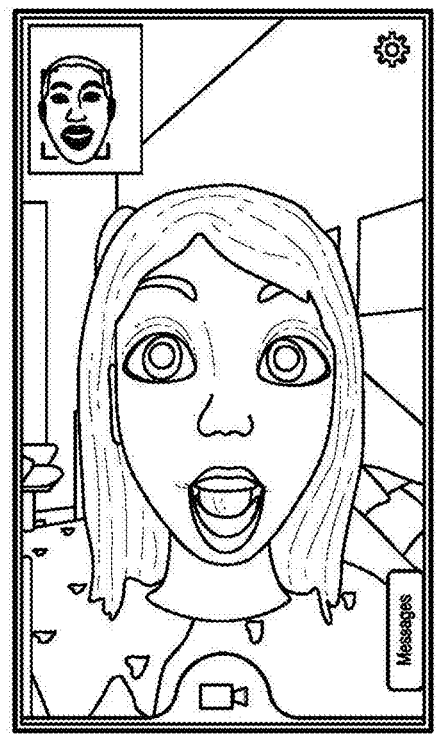

FIGS. 6A and 6B are schematic diagrams illustrating products for animating avatars and choosing backgrounds, according to an embodiment.

Figure 7:
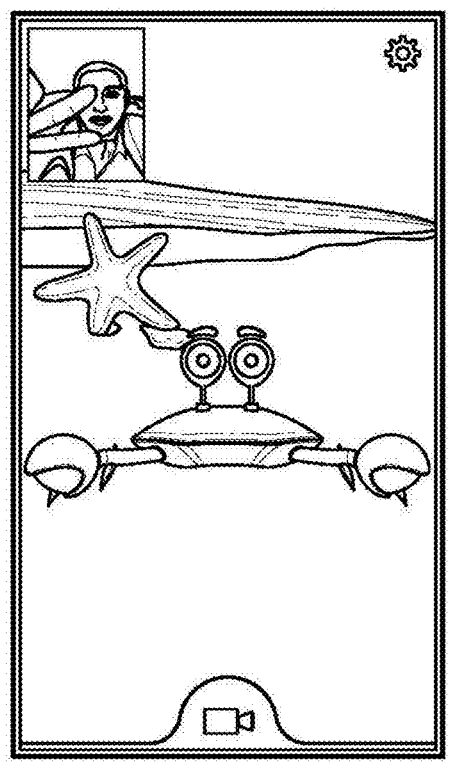
FIG. 7 is a schematic diagram illustrating a product for animating an avatar using finger gestures, according to an embodiment.

FIG. 7 is a schematic diagram illustrating a product for animating an avatar using finger gestures, according to an embodiment. Although not shown, the avatar may be animated according to a finger gesture, such as the finger gesture made by the user in FIG. 7. In an example, a user's facial gesture and finger gesture may be used to create facial motion data and finger gestures. The facial motion data and finger gestures may be used to animate an avatar, such as the avatar in FIG. 7. For example, the user's finger gesture of FIG. 7 may be used to open a crab's claw (the avatar in FIG. 7).

In an example, near-range finger gesture detection may be used to determine the finger gestures of a user's fingers. The finger gestures may then be used to animate an avatar. In another example, a sensor may be used to generate physical input commands that may be used to animate an avatar. For example, a user may shake the mobile device 304 of FIG. 3 and the motion may be stored as a set of physical input commands. The physical input commands may be used to animate an avatar. For example, the user shaking the mobile device 304 may be used to animate a tail of an avatar (not shown).

In an example, a technique may include capturing a series of finger images, computing a set of finger gestures for each of the finger images, and transmitting the set of finger gestures to an animation device. The animation device may include using the set of finger gestures to animate an avatar and display the animation.

Figure 8:
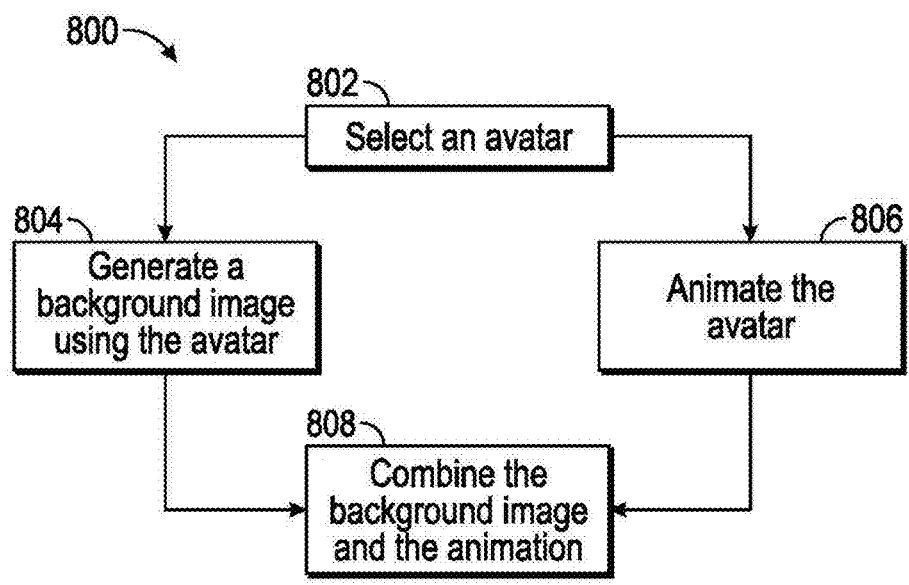
FIG. 8 is a flow chart illustrating a method for combining an animation of an avatar and a background image, according to an embodiment.

FIG. 8 is a flow chart illustrating a method 800 for combining an animation of an avatar and a background image, according to an embodiment. In an example, at block 802, a user selects an avatar. At block 804, a background image is generated using the avatar. In an alternative embodiment, the user may manually select or change the background image. At block 806, the background image and the avatar are used, along with facial motion data, to animate the avatar. At block 808, the background image and the animation are combined. In an alternative embodiment, the avatar and the facial motion data are used to animate the avatar and the background image may be added after animating the avatar. For example, if a user selects a crab as an avatar, an image including sand or a sea may be used as a background image. The background image may also use an image of a user's present location or a background image taken from a series of images of a user's face. In another embodiment, a background image is selected and used to animate an avatar.

In an example, a user may be presented with avatars or backgrounds using location-based information. For example, if a user or a device is determined to be proximate to a particular store, the user may be presented with avatars that look like items sold in the particular store. For example, if the user is near a store that sells teddy bears, the user may be presented with a teddy bear avatar. The user may also be presented with background images related to a particular location. For example, if a user is in Paris, France, the user may be presented with a background image featuring the Eiffel Tower.

Figure 9:
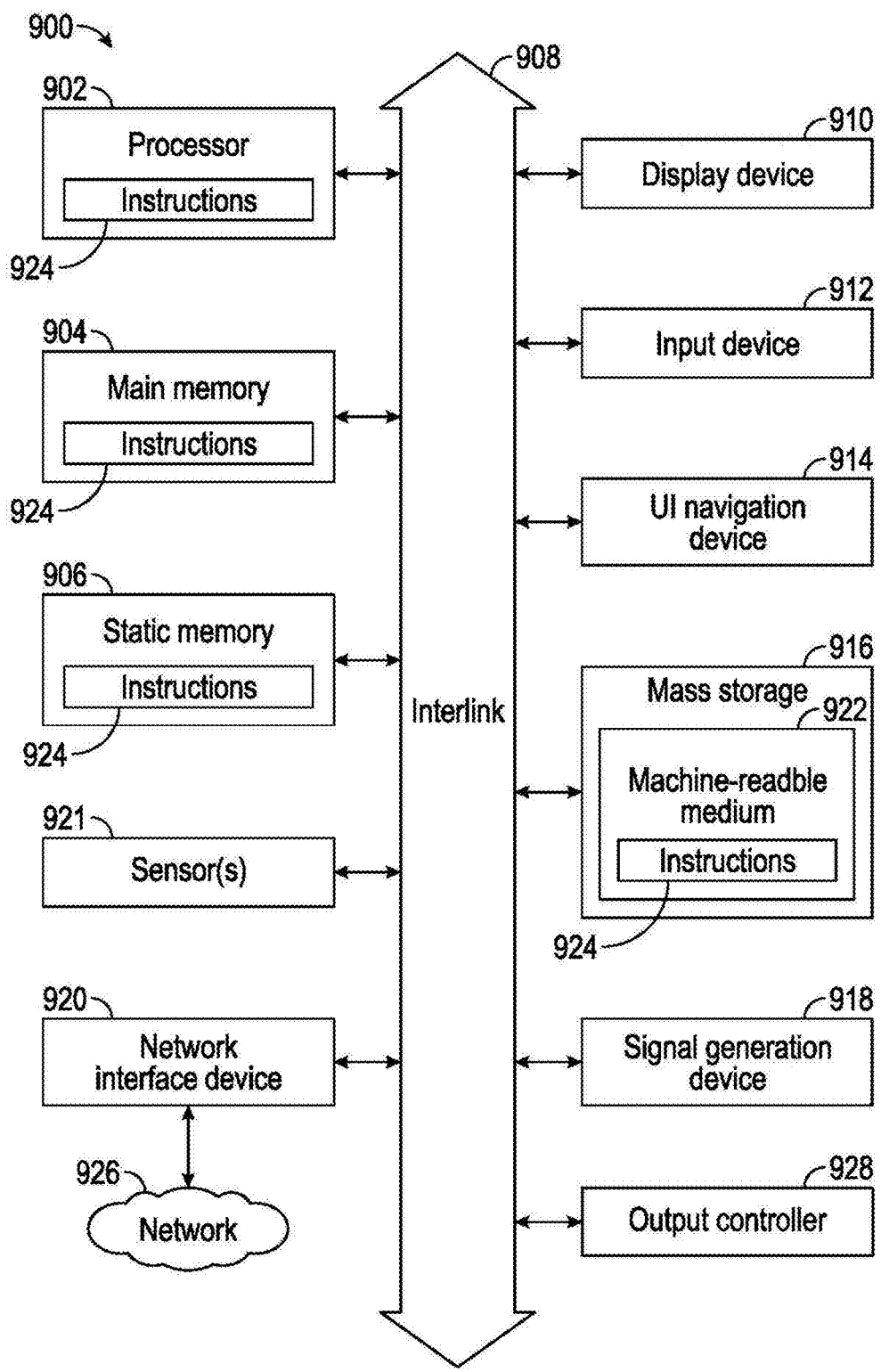
FIG. 9 is a block diagram of a machine upon which one or more embodiments may be implemented.

FIG. 9 is a block diagram of a machine 900 upon which one or more embodiments may be implemented. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., a computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

ADDITIONAL NOTES & EXAMPLES

Example 1 includes the subject matter embodied by a system for facial gesture driven animation communication comprising: a system for facial gesture driven animation communication, the system comprising: an image capture device to capture a series of images of a face, a facial recognition module to compute facial motion data for each of the images in the series of images, and a communication module to transmit the facial motion data to an animation device, wherein the animation device is to use the facial motion data to animate an avatar on the animation device.

In Example 2, the subject matter of Example 1 can optionally include wherein the animation device is to animate a user selected avatar.

In Example 3, the subject matter of one or any combination of Examples 1-2 can optionally include wherein the image capture device captures an image corresponding to content, further comprising a content module to: identify the content, using the image corresponding to the content, and generate, using the identity of the content, a second avatar, the second avatar corresponding to the content.

In Example 4, the subject matter of one or any combination of Examples 1-3 can optionally include wherein the communication module transmits an avatar identification, corresponding to the second avatar, to the animation device.

In Example 5, the subject matter of one or any combination of Examples 1-4 can optionally include wherein to animate the avatar, the animation device is to animate the second avatar.

In Example 6, the subject matter of one or any combination of Examples 1-5 can optionally include wherein the image capture device captures a series of finger images and further comprising a finger recognition module to compute a set of finger gestures for each of the finger images.

In Example 7, the subject matter of one or any combination of Examples 1-6 can optionally include wherein the communication module transmits the set of finger gestures to the animation device, and wherein the animation device is further to use the set of finger gestures to animate the avatar on the animation device.

In Example 8, the subject matter of one or any combination of Examples 1-7 can optionally include further comprising a background module to generate a background image, and wherein the animation device is to use the background image when animating the avatar.

In Example 9, the subject matter of one or any combination of Examples 1-8 can optionally include wherein the background module generates the background image using the avatar.

In Example 10, the subject matter of one or any combination of Examples 1-9 can optionally include wherein the communication module is to transmit the background image to the animation device.

In Example 11, the subject matter of one or any combination of Examples 1-10 can optionally include further comprising a location module to determine a location of the image capture device, and an avatar determination module to, using the location of the image capture device, generate a location-based avatar.

In Example 12, the subject matter of one or any combination of Examples 1-11 can optionally include wherein to animate the avatar, the animation device is to animate the location-based avatar.

In Example 13, the subject matter of one or any combination of Examples 1-12 can optionally include further comprising: a physical input capture device to capture a series of physical inputs, a physical input module to compute a set of physical input commands for the series of physical inputs, and wherein the communication module transmits the set of physical input commands to the animation device, and wherein the animation device is to use the set of physical input commands to animate the avatar on the animation device.

In Example 14, the subject matter of one or any combination of Examples 1-13 can optionally include wherein the avatar is a two-dimensional avatar.

In Example 15, the subject matter of one or any combination of Examples 1-14 can optionally include wherein the avatar is a three-dimensional avatar.

In Example 16, the subject matter of one or any combination of Examples 1-15 can optionally include further comprising an audio capture device to capture audio from content, further comprising a content module to: identify, using the audio, the content, and generate using the identity of the content, a second avatar.

In Example 17, the subject matter of one or any combination of Examples 1-16 can optionally include wherein the communication module transmits an avatar identification, corresponding to the second avatar, to the animation device.

In Example 18, the subject matter of one or any combination of Examples 1-17 can optionally include wherein to animate the avatar, the animation device is to animate the second avatar.

In Example 19, the subject matter of one or any combination of Examples 1-18 can optionally include further comprising a display module to use the facial motion data to animate the avatar and display the avatar to a local user.

In Example 20, the subject matter of one or any combination of Examples 1-19 can optionally include wherein the communication module transmits the location-based avatar to the animation device.

Example 21 includes the subject matter embodied by a system for animating an avatar, the system comprising: a communication module to receive facial motion data from a capture device, wherein the capture device is to capture a series of images of a face and compute the facial motion data for each of the images in the series of images, and an animation module to animate the avatar using the facial motion data.

In Example 22, the subject matter of Example 21 can optionally include wherein the communication module is further to receive an avatar identification that corresponds to a television avatar and wherein to animate the avatar, the animation module is to animate the television avatar.

In Example 23, the subject matter of one or any combination of Examples 21-22 can optionally include wherein the communication module is further to receive a set of finger gestures from the capture device, wherein the capture device is to capture a series of finger images and compute the set of finger gestures for each of the finger images in the series of finger images, and wherein the animation module is further to use the set of finger gestures to animate the avatar.

In Example 24, the subject matter of one or any combination of Examples 21-23 can optionally include wherein the communication module receives a background image from the capture device, wherein the capture device is further to determine the background image using the avatar.

In Example 25, the subject matter of one or any combination of Examples 21-24 can optionally include wherein the communication module is further to receive a location-based avatar from the capture device, wherein the capture device is to determine a location of the capture device, and using the location of the image capture device, the capture device is to generate the location-based avatar, and wherein to animate the avatar, the animation module is to animate the location-based avatar.

In Example 26, the subject matter of one or any combination of Examples 21-25 can optionally include further comprising a background module to generate a background image using the background image.

In Example 27, the subject matter of one or any combination of Examples 21-26 can optionally include wherein the avatar is a two-dimensional avatar.

In Example 28, the subject matter of one or any combination of Examples 21-27 can optionally include wherein the avatar is a three-dimensional avatar.

In Example 29, the subject matter of one or any combination of Examples 21-28 can optionally include wherein to animate the avatar, the animation module is to animate the avatar that corresponds to the avatar identification.

In Example 30, the subject matter of one or any combination of Examples 21-29 can optionally include wherein the animation module is further to animate the avatar using the background image.

In Example 31, the subject matter of one or any combination of Examples 21-30 can optionally include wherein the communication module is further to receive a location of the capture device, and using the location of the capture device, generate a location-based avatar.

In Example 32, the subject matter of one or any combination of Examples 21-31 can optionally include wherein to animate the avatar, the animation module is to animate the location-based avatar.

In Example 33, the subject matter of one or any combination of Examples 21-32 can optionally include wherein the communication module receives a set of physical input commands from the capture device, wherein the capture device is to capture a series of physical inputs and compute the set of physical input commands for the series of physical inputs.

In Example 34, the subject matter of one or any combination of Examples 21-33 can optionally include wherein the animation module is further to animate the avatar using the set of physical input commands.

In Example 35, the subject matter of one or any combination of Examples 21-34 can optionally include wherein the animation module animates a user selected avatar.

Example 36 includes the subject matter embodied by a machine-readable medium including instructions for changing an avatar, which when executed by a machine, cause the machine to: capture a series of images of a face, compute facial motion data for each of the images in the series of images, and transmit the facial motion data to an animation device, wherein the animation device is configured to use the facial motion data to animate an avatar on the animation device.

In Example 37, the subject matter of Example 36 can optionally include wherein the animation device is to use the facial motion data to animate a two-dimensional avatar.

In Example 38, the subject matter of one or any combination of Examples 36-37 can optionally include wherein the animation device is to use the facial motion data to animate a three-dimensional avatar.

In Example 39, the subject matter of one or any combination of Examples 36-38 can optionally include wherein to capture an image includes to capture an image corresponding to content, further comprising instructions which, when executed by a machine, cause the machine to: identify the content, using the image corresponding to the content, and generate, using the identity of the content, a second avatar, the second avatar corresponding to the content.

In Example 40, the subject matter of one or any combination of Examples 36-39 can optionally include wherein to transmit includes to transmit an avatar identification corresponding to the second avatar to the animation device.

In Example 41, the subject matter of one or any combination of Examples 36-40 can optionally include wherein the animation device is to use the facial motion data to animate the second avatar.

In Example 42, the subject matter of one or any combination of Examples 36-41 can optionally include further comprising instructions which, when executed by a machine, cause the machine to: capture audio from content using an audio capture device, identify, using the audio, the content, and generate, using the identity of the content, a second avatar, the second avatar corresponding to the content.

In Example 43, the subject matter of one or any combination of Examples 36-42 can optionally include wherein to transmit includes to transmit an avatar identification, corresponding to the second avatar, to the animation device.

In Example 44, the subject matter of one or any combination of Examples 36-43 can optionally include wherein the animation device is to use the facial motion data to animate the second avatar.

In Example 45, the subject matter of one or any combination of Examples 36-44 can optionally include further comprising instructions, which when executed by a machine, cause the machine to capture a series of finger images.

In Example 46, the subject matter of one or any combination of Examples 36-45 can optionally include further comprising instructions, which when executed by a machine, cause the machine to compute a set of finger gestures for each of the finger images.

In Example 47, the subject matter of one or any combination of Examples 36-46 can optionally include wherein to transmit includes to transmit the set of finger gestures to the animation device, and wherein the animation device is further to use the set of finger gestures to animate the avatar on the animation device.

In Example 48, the subject matter of one or any combination of Examples 36-47 can optionally include further comprising instructions, which when executed by a machine, cause the machine to generate a background image, and wherein the animation device is to use the background image when animating the avatar.

In Example 49, the subject matter of one or any combination of Examples 36-48 can optionally include wherein to generate the background image includes to generate the background image using the avatar.

In Example 50, the subject matter of one or any combination of Examples 36-49 can optionally include wherein to transmit includes to transmit the background image to the animation device.

In Example 51, the subject matter of one or any combination of Examples 36-50 can optionally include further comprising instructions, which when executed by a machine, cause the machine to determine a location at the image capture device, and use the location at the image capture device to generate a location-based avatar.

In Example 52, the subject matter of one or any combination of Examples 36-51 can optionally include wherein to transmit includes to transmit the location-based avatar to the animation device.

In Example 53, the subject matter of one or any combination of Examples 36-52 can optionally include wherein the animation device is to use the facial motion data to animate the location-based avatar.

In Example 54, the subject matter of one or any combination of Examples 36-53 can optionally include further comprising instructions, which when executed by a machine, cause the machine to: capture a series of physical inputs at a physical input capture device, compute a set of physical input commands for the series of physical inputs, and wherein to transmit includes to transmit the set of physical input commands to the animation device, and wherein the animation device is to use the set of physical input commands to animate the avatar on the animation device.

Example 54 includes subject matter for animating an avatar comprising a method for facial gesture driven animation communication, the method comprising: capturing a series of images of a face, at an image capture device, computing facial motion data for each of the images in the series of images, and transmitting the facial motion data to an animation device, wherein the animation device is to use the facial motion data to animate an avatar on the animation device.

In Example 55, the subject matter of Example 54 can optionally include wherein capturing an image includes capturing an image corresponding to content, further comprising: identifying the content, using the image corresponding to the content, and generating, using the identity of the content, a second avatar, the second avatar corresponding to the content, wherein the animation device is to use the facial motion data to animate the second avatar.

In Example 56, the subject matter of one or any combination of Examples 54-55 can optionally include further comprising: capturing a series of finger images, computing a set of finger gestures for each of the finger images, wherein transmitting includes transmitting the set of finger gestures to the animation device, and wherein the animation device is further to use the set of finger gestures to animate the avatar on the animation device.

In Example 57, the subject matter of one or any combination of Examples 54-56 can optionally include further comprising: determining a location at the image capture device, generating a location-based avatar using the location at the image capture device, wherein transmitting includes transmitting the location-based avatar to the animation device, and wherein the animation device is to use the facial motion data to animate the location-based avatar.

In Example 58, the subject matter of one or any combination of Examples 54-57 can optionally include further comprising: generating a background image, wherein the animation device is to use the background image when animating the avatar, wherein generating the background image includes using the avatar, and wherein transmitting includes transmitting the background image to the animation device.

In Example 59, the subject matter of one or any combination of Examples 54-58 can optionally include wherein the animation device is to use the facial motion data to animate a two-dimensional avatar.

In Example 60, the subject matter of one or any combination of Examples 54-59 can optionally include wherein the animation device is to use the facial motion data to animate a three-dimensional avatar.

In Example 61, the subject matter of one or any combination of Examples 54-60 can optionally include wherein transmitting includes transmitting an avatar identification corresponding to the second avatar to the animation device.

In Example 62, the subject matter of one or any combination of Examples 54-61 can optionally include further comprising capturing audio from content using an audio capture device, identifying the content, using the audio, and generating, using the identity of the content, a second avatar.

In Example 63, the subject matter of one or any combination of Examples 54-62 can optionally include wherein transmitting includes transmitting an avatar identification, corresponding to the second avatar, to the animation device.

In Example 64, the subject matter of one or any combination of Examples 54-63 can optionally include wherein the animation device is to use the facial motion data to animate the second avatar.

In Example 65, the subject matter of one or any combination of Examples 54-64 can optionally include further comprising: capturing a series of physical inputs at a physical input capture device, computing a set of physical input commands for the series of physical inputs, and wherein transmitting includes transmitting the set of physical input commands to the animation device, and wherein the animation device is to use the set of physical input commands to animate the avatar on the animation device.

In Example 66, the subject matter of one or any combination of Examples 54-65 can optionally include wherein the animation device is to animate a user selected avatar.

In Example 67, the subject matter of one or any combination of Examples 54-66 can optionally include a machine-readable medium including instructions for changing an avatar, which when executed by a machine, cause the machine to perform any of the methods of Examples 54-66.

In Example 68, the subject matter of one or any combination of Examples 54-67 can optionally include an apparatus comprising means for performing any of the methods of Examples 54-66.

Example 69 includes subject matter for animating an avatar comprising a method for displaying an avatar animation, the method comprising: receiving, at an animation device, a facial motion data from a capture device, wherein the capture device is to capture a series of images of a face and compute the facial motion data for each of the images in the series of images, and animating the avatar using the facial motion data at the animation device.

In Example 70, the subject matter of Example 69 can optionally include wherein the capture device is to use the facial motion data to animate a two-dimensional avatar.

In Example 71, the subject matter of one or any combination of Examples 69-70 can optionally include wherein the capture device is to use the facial motion data to animate a three-dimensional avatar.

In Example 72, the subject matter of one or any combination of Examples 69-71 can optionally include wherein receiving includes receiving an avatar identification.

In Example 73, the subject matter of one or any combination of Examples 69-72 can optionally include wherein animating the avatar includes animating the avatar that corresponds to the avatar identification.

In Example 74, the subject matter of one or any combination of Examples 69-73 can optionally include wherein the avatar identification corresponds to a second avatar, the second avatar corresponding to content identified by the capture device.

In Example 75, the subject matter of one or any combination of Examples 69-74 can optionally include wherein animating the avatar includes animating the second avatar.

In Example 76, the subject matter of one or any combination of Examples 69-75 can optionally include wherein receiving includes receiving a set of finger gestures from the capture device, and wherein the capture device is to capture a series of finger images and compute the set of finger gestures for each of the finger images in the series of finger images.

In Example 77, the subject matter of one or any combination of Examples 69-76 can optionally include further comprising using the set of finger gestures to animate the avatar.

In Example 78, the subject matter of one or any combination of Examples 69-77 can optionally include wherein receiving includes receiving a background image from the capture device, and wherein the capture device is further to determine the background image.

In Example 79, the subject matter of one or any combination of Examples 69-78 can optionally include wherein animating the avatar includes animating the avatar using the background image.

In Example 80, the subject matter of one or any combination of Examples 69-79 can optionally include further comprising generating a background image at the animation device.

In Example 81, the subject matter of one or any combination of Examples 69-80 can optionally include wherein animating the avatar includes animating the avatar using the background image.

In Example 82, the subject matter of one or any combination of Examples 69-81 can optionally include wherein receiving includes receiving a location-based avatar from the capture device, wherein the capture device is to determine a location of the capture device, and using the location of the image capture device, the capture device is to generate the location-based avatar.

In Example 83, the subject matter of one or any combination of Examples 69-82 can optionally include wherein animating the avatar includes animating the location-based avatar.

In Example 84, the subject matter of one or any combination of Examples 69-83 can optionally include wherein receiving includes receiving a location of the capture device, and further comprising, using the location of the capture device to generate a location-based avatar.

In Example 85, the subject matter of one or any combination of Examples 69-84 can optionally include wherein animating the avatar includes animating the location-based avatar.

In Example 86, the subject matter of one or any combination of Examples 69-85 can optionally include wherein receiving includes receiving a set of physical input commands from the capture device, and wherein the capture device is to capture a series of physical inputs and compute the set of physical input commands for the series of physical inputs.

In Example 87, the subject matter of one or any combination of Examples 69-86 can optionally include wherein animating the avatar includes animating the avatar using the set of physical input commands.

In Example 88, the subject matter of one or any combination of Examples 69-87 can optionally include wherein animating the avatar includes animating user selected avatar.

In Example 89, the subject matter of one or any combination of Examples 69-88 can optionally include a machine-readable medium including instructions for changing an avatar, which when executed by a machine, cause the machine to perform any of the methods of Examples 69-88.

In Example 90, the subject matter of one or any combination of Examples 69-89 can optionally include An apparatus comprising means for performing any of the methods of Examples 69-88.

Example 91 includes subject matter for animating an avatar comprising an apparatus comprising: means for capturing a series of images of a face, means for computing facial motion data for each of the images in the series of images, and means for transmitting the facial motion data to an animation device, wherein the animation device is to use the facial motion data to animate an avatar on the animation device.

Example 92 includes subject matter for animating an avatar comprising a machine-readable medium including instructions for changing an avatar, which when executed by a machine, cause the machine to: receive, at an animation device, facial motion data from a capture device, wherein the capture device is to capture a series of images of a face and compute the facial motion data for each of the images in the series of images, and animate an avatar using the facial motion data at the animation device.

Example 93 includes subject matter for animating an avatar comprising an apparatus comprising: means for receiving, at an animation device, facial motion data from a capture device, wherein the capture device is to capture a series of images of a face and compute the facial motion data for each of the images in the series of images, and means for animating an avatar using the facial motion data at the animation device.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A system for facial gesture driven animation communication, the system comprising:
    an image capture device coupled to a mobile device, the image capture device to capture a series of images of a face of a user, wherein the image capture device is configured to capture an image corresponding to content of a second device, the second device to be viewed by the user, wherein the second device and mobile device comprise a second-screen usage system, when in operation by the user,
    wherein the content of the second device is different than the series of images of the face of the user;
    a facial recognition module to compute facial motion data for each of the images in the series of images;
    a content module, when in operation, communicatively coupled to the mobile device, the content module to:
        identify the content, using the image corresponding to the content, and
        generate, using the identity of the content, a list of one or more content related avatars, the one or more content related avatars corresponding to the content of the second device;
    a user interface configured to:
        present the list of the one or more content related avatars to the user;
        responsive to selection by the user, identify a selected content related avatar for animation using the facial motion data; and a communication module to transmit the facial motion data to an animation device, wherein the animation device is to use the facial motion data to animate the selected content related avatar on the animation devices.

2. The system of claim 1, wherein the animation device is to animate a user selected avatar.

3. The system of claim 1, wherein the communication module transmits an avatar identification, corresponding to the content related avatar, to the animation device.

4. The system of claim 3, wherein to animate the avatar, the animation device is to animate the content related avatar.

5. The system of claim 1, wherein the image capture device captures a series of finger images and further comprising a finger recognition module to compute a set of finger gestures for each of the finger images.

6. The system of claim 5, wherein the communication module transmits the set of finger gestures to the animation device, and wherein the animation device is further to use the set of finger gestures to animate the avatar on the animation device.

7. The system of claim 1, further comprising a background module to generate a background image, wherein the background image is automatically selected based on contextual information, and wherein the animation device is to combine the background image with animation of the avatar when animating the avatar.

8. The system of claim 7, wherein the communication module is to transmit the background image to the animation device.

9. The system of claim 7, further comprising a location module to determine a location of the image capture device, and an avatar determination module to, using the location of the image capture device, generate a location-based avatar, wherein the contextual information is information corresponding to at least one of: the avatar, a background to the series of images of the face, or a location of the user.

10. The system of claim 9, wherein to animate the avatar, the animation device is to animate the location-based avatar.

11. The system claim 1, further comprising:
a physical input capture device to capture a series of physical inputs;
a physical input module to compute a set of physical input commands for the series of physical inputs; and
wherein the communication module transmits the set of physical input commands to the animation device, and wherein the animation device is to use the set of physical input commands to animate the avatar on the animation device.

12. At least one non-transitory machine-readable medium including instructions for changing an avatar, which when executed by a machine, cause the machine to:
capture a series of images of a face of a user;
compute facial motion data for each of the images in the series of images; and
transmit the facial motion data to an animation device, wherein the animation device is to use the facial motion data to animate an avatar on the animation device;
capture an image corresponding to content of a second device, the second device to be viewed by the user, wherein the second device and animation device comprise a second-screen usage system, when in operation by the user, wherein the content of the second device is different than the series of images of the user;
identify the content, using the image corresponding to the content;
generate, using the identity of the content, a list of one or more content related avatars, the one or more content related avatars corresponding to the content of the second device;
responsive to selection by the user; identify a selected content related avatar for animation using the facial motion data; and
transmit the selected content related avatar to the animation device wherein the animation device is to use the facial motion data to animate the selected content related avatar in place of the avatar, on the animation device.

13. The at least one machine-readable medium of claim 12, wherein the animation device is to use the facial motion data to animate the content related avatar.

14. The at least one machine-readable medium of claim 12, further comprising instructions, which when executed by a machine, cause the machine to:
compute a set of finger gestures for each of the finger images; and
wherein to transmit includes to transmit the set of finger gestures to the animation device; and
wherein the animation device is further to use the set of finger gestures to animate the avatar on the animation device.

15. The at least one machine-readable medium of claim 12, further comprising instructions, which when executed by a machine, cause the machine to generate a background image, wherein the background image is automatically selected based on contextual information, and wherein the animation device is to use the background image when animating the avatar, wherein the contextual information is information corresponding to at least one of:
the avatar, a background to the series of images of the face, or a location of the user.

16. The at least one machine-readable medium of claim 12, further comprising instructions, which when executed by a machine, cause the machine to:
determine a location at the image capture device; and
use the location at the image capture device to generate a location-based avatar; and
wherein the animation device is to use the facial motion data to animate the location-based avatar.

17. A system for animating an avatar, the system comprising:
a communication module coupled to a first device to receive facial motion data from a capture device, wherein the capture device is to capture a series of images of a face of a user and compute the facial motion data for each of the images in the series of images, wherein the capture device is configured to capture an image corresponding to content of a second device, the second device to be viewed by the user, wherein the second device and first device comprise a second-screen usage system, when in operation by the user, wherein the content of the second device is different than the series of images of the first user;
the first device to:
use an identity of the content associated with the image corresponding to the content, and
generate, using the identity of the content, a list of one or more content related avatars, the one or more content related avatars corresponding to the content of the second device;
present the list of the one or more content related avatars to the user;

responsive to selection by the user, identify a selected content related avatar for animation using the facial motion data; and
an animation module to animate the selected content related avatar using the facial motion data.

18. The system of claim 17, wherein the communication module is further to receive a set of finger gestures from the capture device, wherein the capture device is to capture a series of finger images and compute the set of finger gestures for each of the finger images in the series of finger images, and wherein the animation module is further to use the set of finger gestures to animate the avatar.

19. The system of claim 17, wherein the communication module receives a background image from the capture device, wherein the capture device is further to determine the background image using contextual information, wherein the contextual information is information corresponding to at least one of: the avatar, a background to the series of images of the face, or a location of the user.

20. The system of claim 17, wherein the communication module is further to receive a location-based avatar from the capture device, wherein the capture device is to determine a location of the capture device, and using the location of the image capture device, the capture device is to generate the location-based avatar, and wherein to animate the avatar, the animation module is to animate the location-based avatar.

21. A method for facial gesture driven animation communication, the method comprising:
capturing a series of images of a face of a user, at an image capture device;
computing facial motion data for each of the images in the series of images;
transmitting the facial motion data to an animation device, wherein the animation device is to use the facial motion data to animate an avatar on the animation device;
capturing an image corresponding to content of a second device, the second device to be viewed by the user, wherein the second device and animation device comprise a second-screen usage system, when in operation by the user,
wherein the content of the second device is different than the series of images of the first user;
identifying the content, using the image corresponding to the content;
generating, using the identity of the content, a list of one or more content related avatars, the one or more content related avatars corresponding to the content of the second device;
presenting the list of the one or more content related avatars to the user;
responsive to selection by the user, identifying a selected content related avatar for animation using the facial motion data; and
transmitting the selected content related avatar to the animation device wherein the animation device is to use the facial motion data to animate the selected content related avatar in place of the avatar, on the animation device.

22. The method of claim 21, wherein the animation device is to use the facial motion data to animate the content related avatar.

* * * * *

UNITED STATES PATENT AND TRADEMARK OFFICE
CERTIFICATE OF CORRECTION

PATENT NO. : 9,984,487 B2
APPLICATION NO. : 14/773911
DATED : May 29, 2018
INVENTOR(S) : Li et al.

Page 1 of 1

It is certified that error appears in the above-identified patent and that said Letters Patent is hereby corrected as shown below:

In the Claims

In Column 17, Line 5, in Claim 1, delete "devices." and insert --device.-- therefor In Column 17, Line 41, in Claim 11, after "system", insert --of--

In Column 18, Line 5, in Claim 12, delete "user;" and insert --user,-- therefor

Signed and Sealed this
Eighth Day of October, 2019

Andrei Iancu
*Director of the United States Patent and Trademark Office*